United States Patent [19]

Griffin

[11] Patent Number: 4,936,662
[45] Date of Patent: Jun. 26, 1990

[54] OPTICAL FIBER CONNECTOR

[75] Inventor: Michael E. Griffin, Maplewood, Minn.

[73] Assignee: Minnesota Mining and Manufacturing Company, St. Paul, Minn.

[21] Appl. No.: 308,610

[22] Filed: Feb. 10, 1989

[51] Int. Cl.⁵ .............................................. G02B 6/36
[52] U.S. Cl. ................................................ 350/96.20
[58] Field of Search ........................ 350/96.20, 96.21; 439/447, 358

[56] References Cited

U.S. PATENT DOCUMENTS

| 4,155,624 | 5/1979 | Logan et al. | 350/96.21 |
| α,268,115 | 5/1981 | Slemon et al. | 350/96.21 |
| 4,423,922 | 1/1984 | Porter | 350/96.15 |
| 4,470,180 | 9/1984 | Blomgren | 24/563 |

OTHER PUBLICATIONS

NECEL-000320-0785, Sales Literature by NEC Electronics Inc., entitled: Duplex Snap-On Type Multimode Fiber-Optic Connectors, dated Jul. 1985.
NECEL-000321-0785, Sales Literature by NEC Electronics Inc., entitled: FC Type Single-Mode Fiber-Optic Connectors, dated Jul. 1985.
NECEL-000386-0785, Sales Literature by NEC Electronics Inc., entitled: FC Type Multimode Fiber-Optic Connectors, dated Jul. 1985.

Augat Fiberoptics brochure entitled: Connector Assembly Instructions-Crimp Style, dated 1985.
ITT Cannon Product Bulletin entitled: ITT Cannon Announces Optical Contacts, Size 16, for KJL & KJA MIL-C-38999, Series I & III Connectors, dated Jun. 1983.

Primary Examiner—William L. Sikes
Assistant Examiner—Akm E. Ullah
Attorney, Agent, or Firm—Donald M. Sell; Walter N. Kirn; Stephen W. Buckingham

[57] ABSTRACT

An optical fiber connector can be assembled without an adhesive using a known combination of a grooved mount and a sleeve that can either grip or release a stripped end of an optical fiber. The mount-sleeve combination is positioned within a housing which is open at one end to receive one or more stripped optical fibers and is formed at its other end with a tiny orifice that is radially aligned with a groove of the mount. After inserting a stripped optical fiber through the mount-sleeve combination and the orifice, the sleeve is allowed to grip the fiber, thus restraining it against longitudinal movement. Because of this restraint, the protruding portion of the fiber can be cleaved or polished along with the adjacent portions of the end cap. The housing preferably is formed by a thermoplastic shroud and a ceramic end cap in which the orifice is formed. The shroud preferably has an external latch by which the connector can be disconnectably fastened to a receptacle in a single motion to make low-loss connections to other optical fibers.

13 Claims, 2 Drawing Sheets

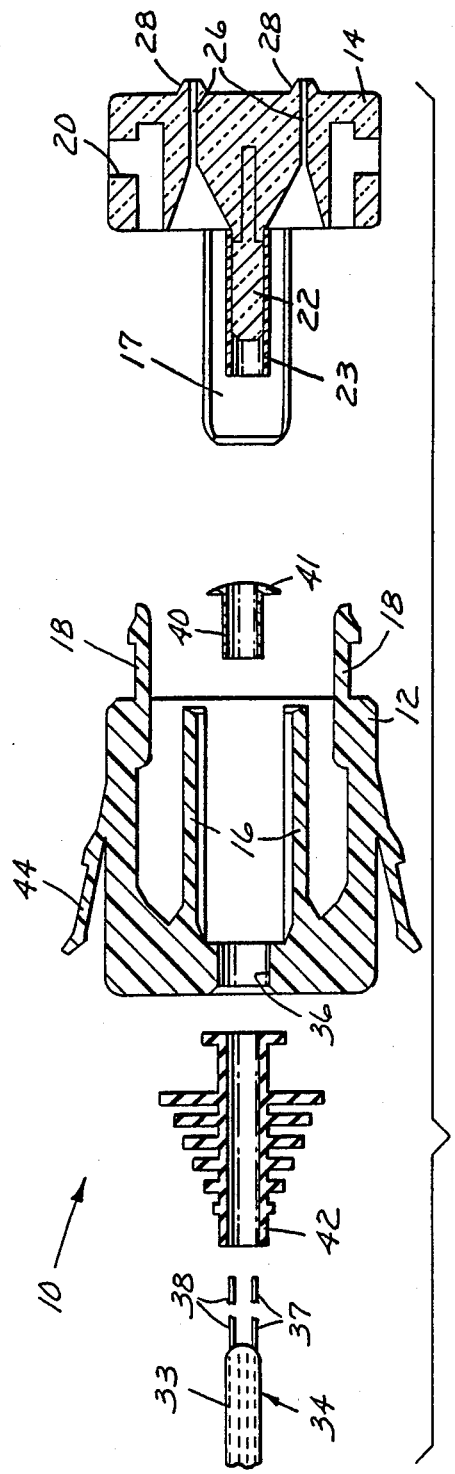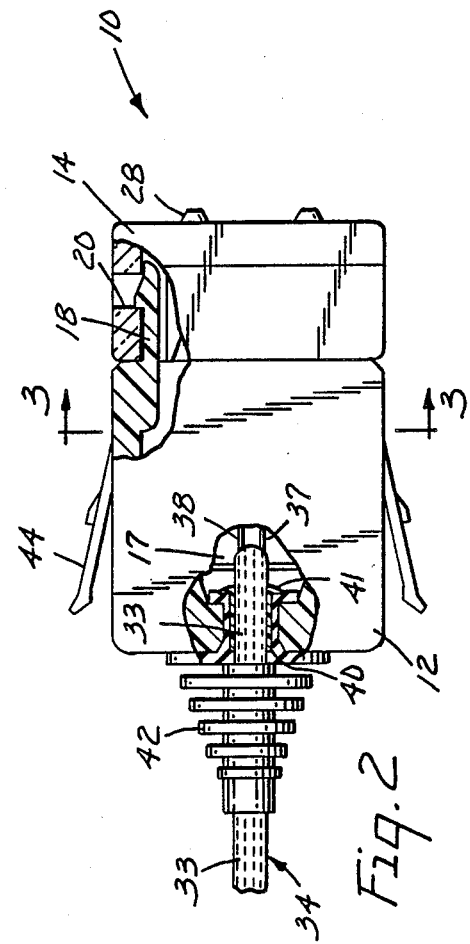
Fig. 1
Fig. 2

OPTICAL FIBER CONNECTOR

BACKGROUND OF THE INVENTION

1. Field of the Invention

The invention concerns an optical fiber connector that permits one or more optical fibers to be disconnectably fastened in a single motion to make low-loss connections either to other optical fibers or to a lens or an opto-electronic element.

2. Description of the Related Art

A variety of connectors are being marketed for disconnectably fastening in a single motion one or more optical fibers either to other optical fibers or to an opto-electronic element. Almost all such connectors are assembled using an adhesive to secure the optical fiber or fibers. To assemble such a connector, the protective coverings are stripped from one end of one or more optical fibers, and the bare end of each fiber is fed into a channel of a fitting while employing an adhesive to bond it to the fitting. Then after polishing the end of the fitting and each adhered fiber, the assembled connector can be fastened to or removed from a receptacle in one motion, thus making a low-loss connection either to an opto-electronic element or to the optical fiber or fibers of an identical connector.

Not only are adhesives messy, polluting and possibly toxic, but their use requires some skill. Furthermore, the adhesive is typically supplied with the warning that it is no longer useful after a certain period of time, e.g., six months.

Among a number of such connectors now being marketed by NEC Electronics, Inc. of Mountain View, Calif., are "FC Type Single-Mode Fiber-Optic Connectors," the assembly of which is described in a pamphlet marked "NECEL-000321-0785" and "Stock No. 836276" and is dated July 1985. Its assembly includes the steps of: (1) strip the cable's outer sheath and jacket to bare an end of the optical fiber, (2) apply adhesive both to the inside of a terminal and to the exposed fiber, (3) insert the coated fiber into the terminal, (4) mechanically fasten the terminal into a ferrule that is formed to permit the fiber to be mechanically interconnected with another fiber or an opto-electronic element, (5) put a small amount of adhesive on the tip of the terminal, (6) heat to cure the adhesive, (7) cleave (cut off) the protruding portion of the fiber, and (8) polish until the terminal end and the fiber face have a glassy appearance.

Connectors similar to the above-discussed NEC snap-on connector that are assembled with adhesive are described in sales literature of ITT Cannon, Fountain Valley, Calif. ("SFOGP-1" dated June 1983); Daini Seikosha Co., Ltd., for its optical fiber connector SAP-2, SF-1; and Augat Fiberoptics of Pawtucket, RI ("F-2938") dated 1985.

A class of connectors that are assembled without an adhesive and yet permit one or more optical fibers to be disconnectably fastened in a single motion are "Crimp and Cleave" connectors from Ensign-Bickford Optics Co., Avon Conn., and "Crimp Style" connectors from Augat Electronics. Their assembly includes the steps of: (1) strip to bare an end of the optical fiber, (2) crimp a ring over the stripped back Kevlar and outer sheath, (3) slip the bare fiber into a bore of a terminal that also fits over said ring, (4) crimp the terminal to the ring, and (5) cleave the protruding portion of the fiber. Because these connectors do not hold the fiber against longitudinal movement, their cleaved faces are not polished. Hence, these connectors do not provide low-loss connections.

A connector that is assembled without adhesive, but does not make connections in a single motion, is described in U.S. Pat. No. 4,155,624 (Logan et al.), FIGS. 1–10 of which illustrate the interconnection of two pairs of optical fibers while also supporting them with respect to a wall 26 or bulkhead. The stripped ends 46,48 of two parallel optical fibers are laid into a rectangular recess 62 and V-notch 64 of a fiber support section 60 and cut with a razor blade to extend about one half the length of the section 60. The stripped ends of another two optical fibers (not shown) are similarly positioned in the rectangular recess and V-notch of an identical fiber support section 74 so that when the two fiber support sections are mechanically joined as shown in FIG. 6, the two sets of "fibers generally meet end-to-end or with a small separation" (col. 3, ls. 61–62). Other elements of Logan's mechanical connector grip the cables covering the optical fibers, thus preventing axial movement within the interconnected sections 60,74.

In order to disconnect fibers that have been interconnected by the Logan device, it would need to be disassembled. Reconnection would require the whole procedure to be repeated.

U.S. Pat. No. 4,470,180 (Blomgren) shows devices that can be used to interconnect the stripped ends of a pair of optical fibers by means of a combination of a grooved mount and a deformable housing. In its normal state, the housing grips the optical fiber against a groove in the mount, but releases that stripped end when deformed.

SUMMARY OF THE INVENTION

The invention provides what is believed to be the first optical fiber connector that can be assembled without an adhesive and yet permits one or more optical fibers to be disconnectably fastened in a single motion to make low-loss connections to other optical fibers or to an opto-electronic element or to an optical lens.

Briefly, the optical fiber connector of the invention includes a housing that is open at one end and is formed with a tiny orifice at its opposite end, means for gripping a stripped end of an optical fiber that has been inserted into said open end of the housing to enter said orifice, and means for mechanically fastening the housing to a receptable in a single motion and for releasing it from the receptable in a single motion.

The phrase "by a single motion" preferably indicates the sort of motion by which a telephone module can be disconnected from a jack and includes the use of screw threads.

The housing of a preferred optical fiber connector of the invention incorporates a device of the Blomgren patent, viz., a combination of a grooved mount and a deformable housing (here called a "sleeve") that when undeformed can grip a stripped end of an optical fiber against a groove in the mount and releases the stripped end when deformed by being squeezed. The housing includes (a) a shroud that is formed with said open end and (b) an end cap that closes the end of the shroud opposite to said open end, serves to position the mount-sleeve combination, and is formed with said tiny orifice. When the sleeve is deformed, a stripped end of an optical fiber can be inserted through said open end of the shroud into a groove of the mount-sleeve combination and through the orifice into which it snugly fits. With the stripped end protruding from the orifice, the sleeve is allowed to return to its undeformed condition, thus restraining the optical fiber against longitudinal movement (as taught in the Blomgren patent). After interconnecting the shroud and end cap, the protruding portion of the fiber can be cleaved to make a low-loss connection to an optical fiber of an identical connector. If desired, the protruding portion can be polished.

By forming the external surface of the housing at said orifice to permit the fiber end or ends to be cleaved or polished to an acute angle, the optical fiber connector of the invention could be disconnectably fastened to a receptacle permitting optical connections to be made like those illustrated in FIG. 3 of U.S. Pat. No. 4,423,922 (Porter).

When it is desired to connect the optical fiber to an opto-electronic element or to a lens mounted in the end cap, the unstripped end of the optical fiber should be cleaved or polished before being inserted into the novel optical fiber connector so that it can make a low-loss connection to that element or lens.

THE DRAWING

The invention may be more easily understood in reference to the drawing, all figures of which are schematic. In the drawing:

FIG. 1 is an exploded longitudinal central cross section through a duplex optical fiber connector of the invention;

FIG. 2 is a top view (partly cut away to a central section) of the duplex optical fiber connector of FIG. 1 that has been assembled with an end of a cable containing two optical fibers;

DETAILED DESCRIPTION

Figure 3:
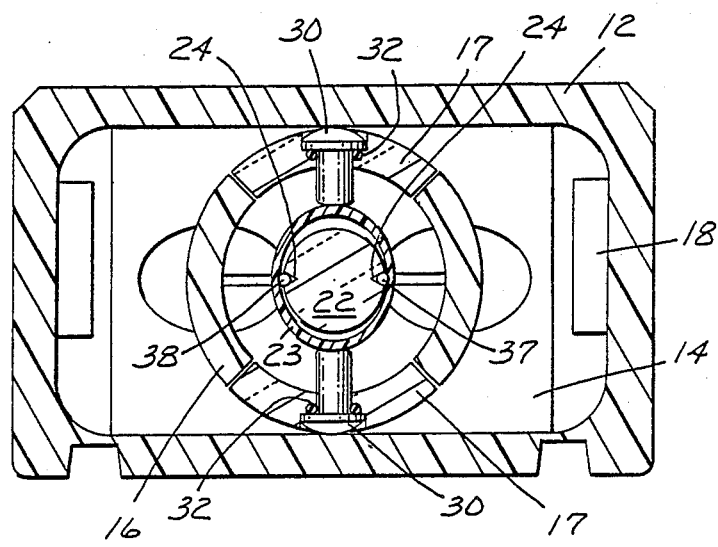
FIG. 3 is an enlarged cross section along line 3—3 of FIG. 2.

The duplex optical fiber connector 10 of FIGS. 1-3 has a thermoplastic shroud 12 and a molded ceramic end cap 14, each of which has a pair of diametrically opposed alignment fingers 16 and 17, respectively, that become interlocked when the connector is assembled. Also projecting from the shroud are a pair of flexible pincers 18 which fit into notches 20 in the end cap to lock it and the shroud together, thus forming a housing.

Cemented into a bore formed in the end cap 14 is a ceramic mount 22, and fitted over the mount is a normally cylindrical polymeric sleeve 23. Formed in the mount are two V-grooves 24, 180° apart from each other. Each of the V-grooves is radially aligned with an orifice 26 that extends through the wall of the end cap at a protuberance 28.

Formed in each of the alignment fingers 17 of the end cap 14 is an aperture in which an elastomeric plug 30 is retained by an O-ring 32 that fits into an undercut in the aperture and into a circular recess in the neck of the plug. The elastomeric plugs normally rest against diametrically opposite points on the sleeve 23 without exerting any pressure, but when squeezed together by ones fingers, they cause the sleeve to become deformed and to be raised above each of the V-grooves 24.

To assemble the optical connector 10, the sheathing 33 at one end of a cable 34 is fed through an open end 36 of the shroud 12 and is stripped to a pair of optical fibers 37 and 38. A collar 40 is crimped to the sheathing at a measured distance from the ends of the fibers. Then while squeezing the elastomeric plugs 30, each of the optical fibers is inserted through the sleeve 23 into one of the V-grooves 24 and through one of the tiny orifices 26 to protrude beyond the protuberance 28. Upon releasing the elastomeric plugs, the sleeve 23 returns to its normally cylindrical shape, thus pinching the optical fibers 37 and 38 against the V-grooves 24. The shroud 12 and end cap 14 are then brought together until the pincers 18 fit into the notches 20 in the end cap to lock them together, and the crimp collar 40 fits into the open end 36 of the shroud, and the flange 41 of the collar prevents the cable 34 from being accidently pulled out of the connector. A strain-relief 42 is fitted over the sheathing 33 of the cable 34 at the open end 36. Finally, the protruding portions of the optical fibers 37 and 38 can be cleaved and polished along with the protuberances 28.

Protruding from the cylindrical exterior of the shroud 12 is a pair of latches 44 like that of a telephone module by which the optical fiber connector 10 can be disconnectably fastened in a single motion to a receptacle (not shown) to make a low-loss connection to the optical fibers of an identical connector. The shroud and latches can be molded as one piece of thermoplastic polymer.

Figure 4:
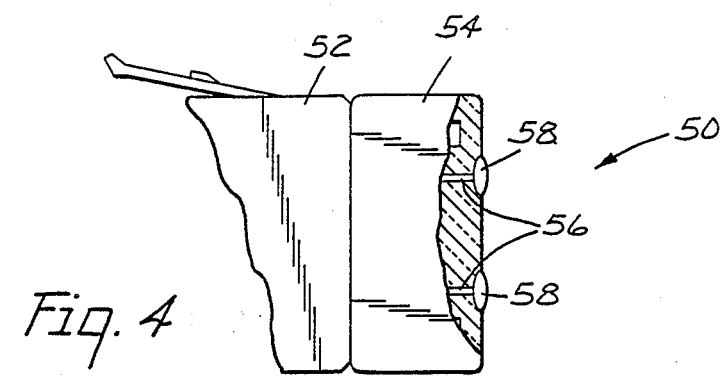
FIG. 4 is a fragmentary top view (partly cut away to a longitudinal central section) of a second optical fiber connector of the invention.

The fragment of the optical fiber connector 50 shown in FIG. 4 has a shroud 52 and an end cap 54 that are identical to the shroud 12 and end cap 14 of FIGS. 1-3 except that the end cap 54 is formed at each of its orifices 56 with a seat into which an optical lens 58 is cemented. Each optical lens 58 can either be used as such or can be part of an opto-electronic element. An optical fiber (not shown) can be pushed through each of the orifices 56 into intimate optical contact with the lenses 58.

What is claimed is:

1. Optical fiber connector comprising
   a housing that is open at one end and is formed with a tiny orifice at its opposite end,
   means for gripping a stripped end of an optical fiber that has been inserted into said open end of the housing to enter said orifice, and
   means for mechanically fastening the housing to a receptacle in a single motion and for releasing the housing from the receptacle in a single motion.

2. Optical fiber connector comprising
   a housing that is open at one end and is formed with a tiny orifice at its opposite end,
   a combination of a grooved mount and a deformable sleeve positioned within the housing, a groove of which is aligned with said orifice, which sleeve when undeformed can grip a stripped end of an optical fiber against a groove in the mount and releases the stripped end when deformed,
   means for deforming the sleeve to permit a stripped end of an optical fiber that is inserted into said open end of the housing to enter a groove of the mount and said orifice, and
   means for mechanically fastening the housing to a receptacle in a single motion and for releasing the housing from the receptacle in a single motion.

3. Optical fiber connector as defined in claim 2 wherein the housing comprises a shroud that is formed with an opening to provide said open end of the housing and an end cap that is formed with said tiny orifice, and the shroud and end cap are formed with means for interconnecting the shroud and end cap.

4. Optical fiber connector as defined in claim 3 wherein said tiny orifice extends through the exterior of the end cap so that said stripped end can protrude through the end cap.

5. Optical fiber connector as defined in claim 3 and further comprising an optical lens mounted in the end cap to be optically aligned with said stripped end.

6. Optical fiber connector as defined in claim 2, the mount of which has at least two V-grooves, each of which can receive a stripped optical fiber of a duplex cable.

7. Optical fiber connector as defined in claim 3 wherein said means for deforming the sleeve is carried by the end cap and is actuable with ones fingers when the shroud and end cap are disconnected.

8. Optical fiber connector as defined in claim 7 where each of the shroud and the end cap has a pair of diametrically opposed alignment fingers which become interlocked when the shroud and the end cap are interconnected.

9. Optical fiber connector as defined in claim 8 wherein each alignment finger of the end cap is formed with a diametric aperture, and said means for deforming the sleeve comprises an elastomeric plug retained in each aperture.

10. Optical fiber connector as defined in claim 9 and further comprising an O-ring to retain each elastomeric plug in each aperture.

11. Optical fiber connector as defined in claim 3 wherein said mechanical fastening means is a snap-fitting means.

12. Optical fiber connector as defined in claim 11 wherein said snap-fitting means comprises a latch protruding from the shroud, and the latch and shroud are a single piece of plastic.

13. Optical fiber connector as defined in claim 12 wherein the end cap is ceramic.

* * * * *